United States Patent [19]
Sommer

[11] 3,946,840
[45] Mar. 30, 1976

[54] FLYWHEEL CLUTCH ASSEMBLY WITH BRAKE

[75] Inventor: Gordon M. Sommer, Grosse Pointe Woods, Mich.

[73] Assignee: G. M. Sommer Company, Inc., Warren, Mich.

[22] Filed: May 10, 1974

[21] Appl. No.: 468,827

[52] U.S. Cl.............. 192/18 A; 192/113 B; 192/86
[51] Int. Cl.²......................................... F16D 67/04
[58] Field of Search............ 192/18 A, 113 B, 12 C, 192/87.12, 86, 87.15

[56] References Cited
UNITED STATES PATENTS

| | | | |
|---|---|---|---|
| 2,150,950 | 3/1939 | Thoma............................. | 192/113 B |
| 2,521,239 | 9/1950 | McDowall et al................ | 192/113 B |
| 3,105,578 | 10/1963 | Meyer............................... | 192/86 X |
| 3,412,834 | 11/1968 | Root................................. | 192/113 B X |
| 3,441,114 | 4/1969 | Pensa............................... | 192/18 A X |
| 3,494,450 | 2/1970 | Mankowsky et al.............. | 192/18 A |
| 3,667,309 | 6/1972 | Franz et al....................... | 192/18 A |
| 3,713,517 | 1/1973 | Sommer........................... | 192/18 A |
| 3,805,931 | 4/1974 | Portmann........................ | 192/18 A |
| 3,835,971 | 9/1974 | Spanke et al.................... | 192/18 A |

Primary Examiner—Benjamin W. Wyche
Attorney, Agent, or Firm—Harness, Dickey & Pierce

[57] ABSTRACT

A clutch assembly is located in the bore of a flywheel for drivingly connecting a coaxially located shaft. The assembly is comprised of a first series of discs mounted for rotation with the shaft, and a second series of interleaved plates supported for rotation with the flywheel. The flywheel is connected to the drive shaft in response to displacement of an actuating means which compressively engages the discs and plates. A separate brake assembly is provided which can be located at either axial end of the shaft, and in one form of the invention, hydraulic fluid is circulated through each of the clutch and brake assemblies from a common source.

1 Claim, 4 Drawing Figures

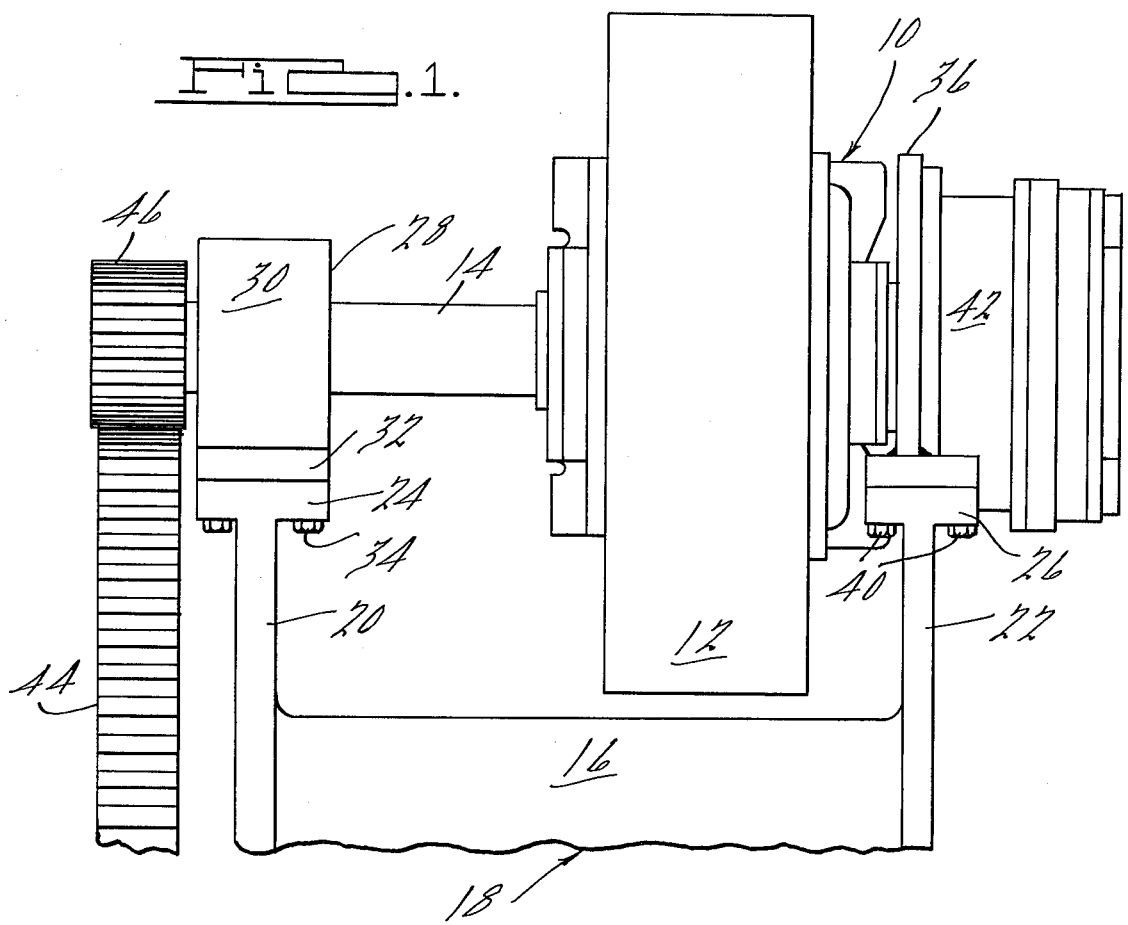
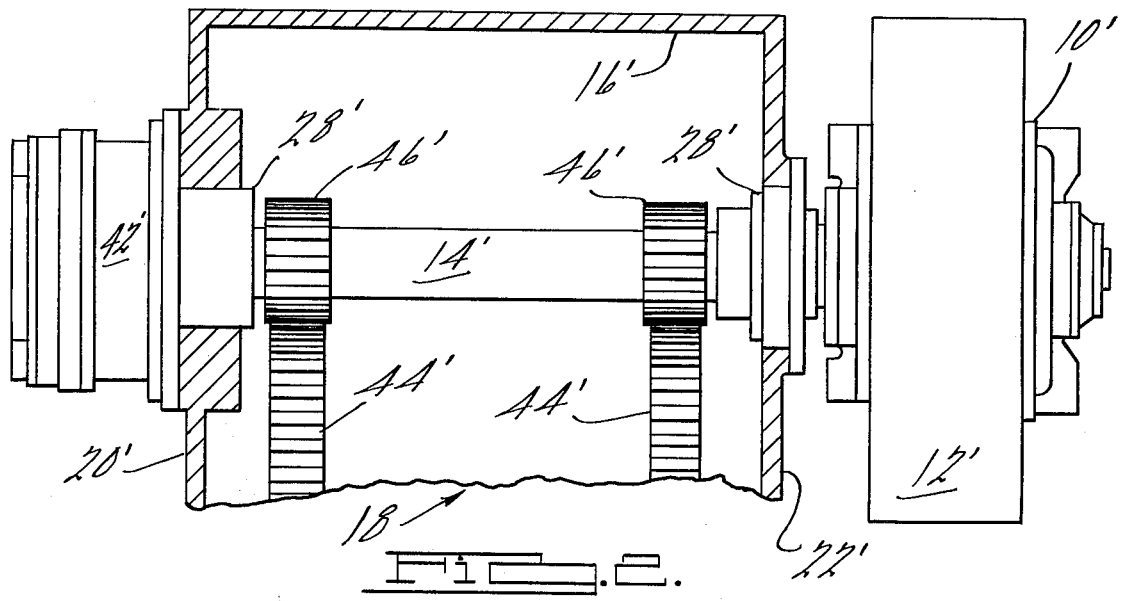

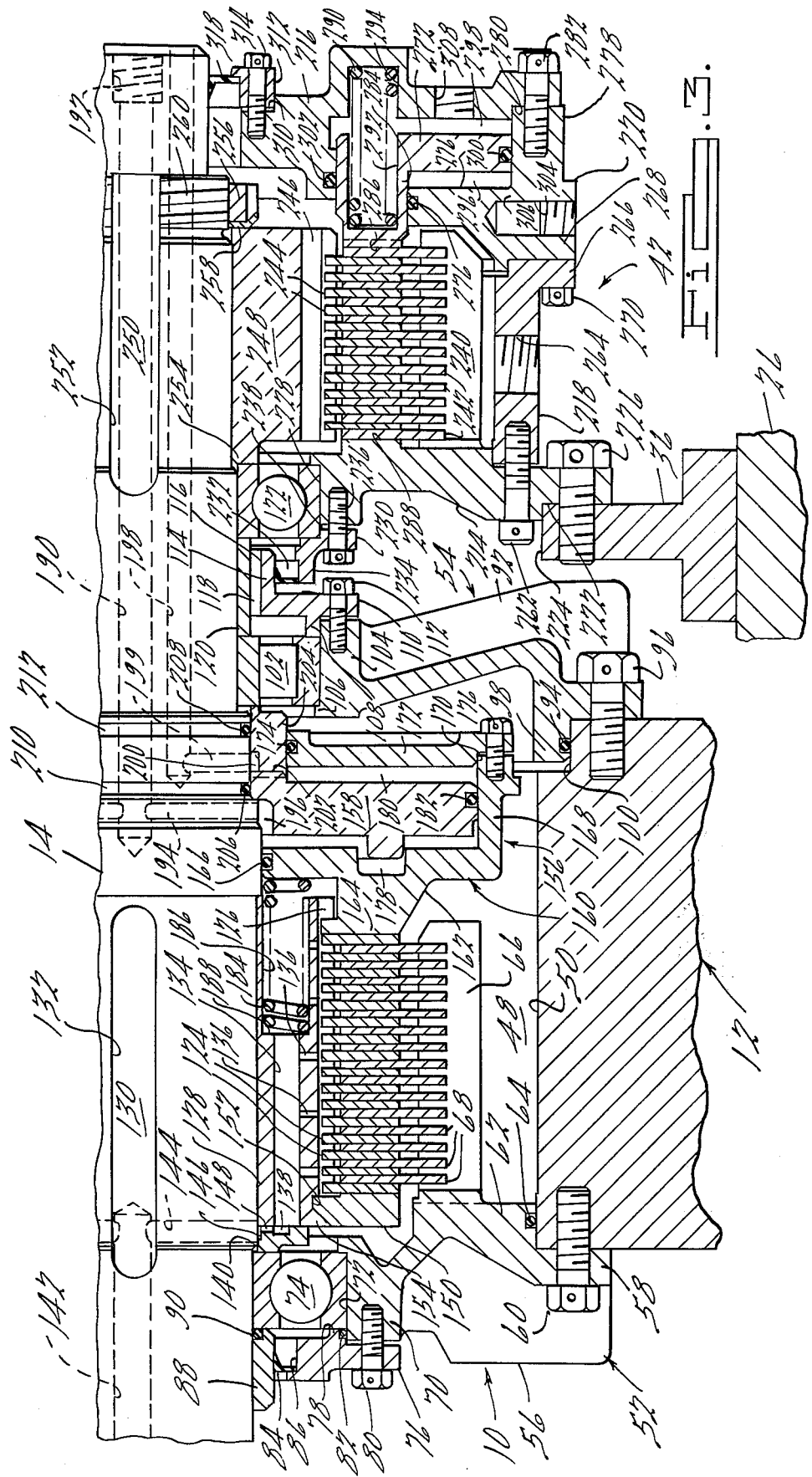

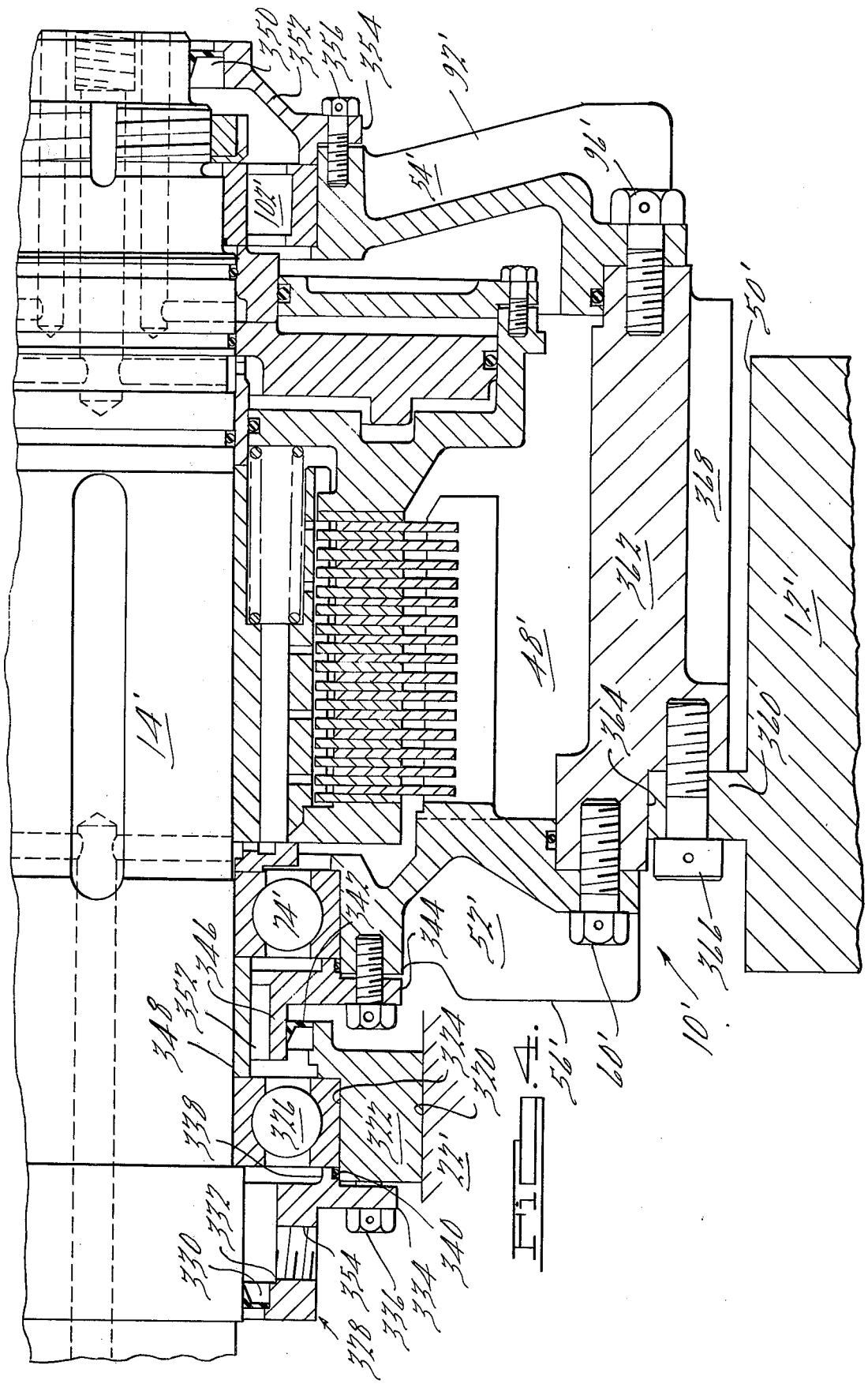

FLYWHEEL CLUTCH ASSEMBLY WITH BRAKE

SUMMARY OF THE INVENTION

This invention relates generally to clutching devices and, more particularly, to a new and improved oil cooled clutch assembly adapted particularly, although not necessarily, for use in operative association with punch presses and the like.

It is accordingly a general object of the present invention to provide a new and improved clutch assembly.

It is a more particular object of the present invention to provide a new and improved clutch-brake unit that is extremely small or compact in size to facilitate installation in the bore of a flywheel.

It is another object of the present invention to provide a new and improved clutch assembly that utilizes a plurality of oil submerged, torque transmitting friction discs which will exhibit a minimal amount of wear by virtue of the fact that the torque transmitting function is achieved by the shearing of oil interjacent the discs.

It is still another object of the present invention to provide a new and improved clutch assembly of the above character that can be operated at high speeds and at high cyclic rates as a result of a low drive inertia and an effective oil cooling medium.

It is a further object of the present invention to provide a clutch assembly disposed coaxially relative to a shaft means and which is compatible for operation and assembly with a separate brake assembly.

It is yet another object of the present invention to provide a clutch assembly of the above described type that features an axially movable, spring loaded cylinder or enclosure defining first and second working chambers on opposite sides of an axially immovable partition whereby the force applied by the springs can be assisted by introducing a pressurized fluid in one of the working chambers.

It is another object of the present invention to provide a new and improved clutch assembly that will find universality of application.

Further important objects of the present invention are to provide a new and improved clutch assembly which is simple in design, economical to produce and operate, extremely rugged and maintenance-free during operation, and wherein the input flywheel and output shaft thereof are readily adapted for mounting to any associated machine, gears, sheaves, couplings, etc.

It is yet a further object of the present invention to provide a new and improved clutch assembly that is adapted to be mounted directly within the hub of a rotating member, such as for example, a rotatable flywheel or the like.

Other objects, features and advantages of the present invention will become apparent from the following detailed description taken in conjunction with the accompanying drawings.

BRIEF DESCRIPTION OF THE DRAWINGS

FIG. 1 is a fragmentary side elevational view of an upper crown section of an exemplary machine or press with which the clutch assembly of the present invention may be operatively associated, and including a separate brake assembly located axially adjacent to the clutch assembly;

FIG. 2 is a fragmentary side elevational view of an upper crown section of another exemplary machine or press with which the clutch assembly of the present invention may be operatively associated and including a separate brake assembly located at an opposite axial end of a driven shaft relative to the clutch assembly.

FIG. 3 is a longitudinal side half sectional view of the clutch assembly illustrated in FIG. 1 in accordance with a first preferred embodiment of the subject invention; and FIG. 4 is a longitudinal side half sectional view of the clutch assembly illustrated in FIG. 2 in accordance with a first preferred embodiment of the subject invention.

DETAILED DESCRIPTION OF THE PREFERRED EMBODIMENTS

Generally speaking, the clutch assembly of the present invention is adapted to find particularly useful application in connection with a flywheel or a similar rotatable member of a metal forming, or metal drawing, stamping press or the like. Although the present invention will find varied use in many other types of applications, due to the especially useful application of the present invention with a typical rotary flywheel, the present invention is shown and described, by way of example, in operative association therewith.

With reference now to FIG. 1 of the drawings, an exemplary clutch unit 10 in accordance with a first preferred form of the subject invention is disposed in the bore of a flywheel 12. The flywheel 12 is drivingly connected to a source of motive power such as an electric motor (not shown) and the torque transmitted therefrom is transferred to a drive shaft 14 in response to selective actuation of the unit 10. The clutch unit 10, flywheel 12, and drive shaft 14 are rotatably supported in a crown section 16 of a machine or press 18. In this regard it will be seen that the press 18 includes a pair of upwardly extending column portions 20 and 22, each having a laterally extending mounting flange 24 and 26, respectively. The left end of the drive shaft 14 is located in a anti-friction bearing means 28 carried by a suitable pillow block 30. The pillow block 30 has a complementary flange section 32 which is connected to the flange 24 by a plurality of suitable screws, bolts, or the like 34. Correspondingly, the right end of the clutch unit 10, flywheel 12 and drive shaft 14 is rotatably supported by an adapter ring 36, the ring 36 having a complementary flange 38 connected to the flange 26 by suitable bolts, screws, or the like 40. As shall hereinafter be described in detail, the ring 36 also functions to support a brake unit 42, the latter being utilized to preclude rotation of the drive shaft 14 and the rotary elements of the press 18 connected thereto. In this regard and by way of illustration, the rotary elements may include an intermediate or main gear 44 of the drive train of the press 18 which is drivingly connected to the shaft 14 via a pinion gear 46.

Referring now to the drawings and in particular to FIG. 3, a clutch unit 10 in accordance with the present invention is shown generally as comprising an internal cavity or fluid reservoir 48 located between an outer peripheral surface of the shaft and an inner peripheral surface of a bore 50 of the flywheel 12, and axially between adjacent marginal surfaces of first and second axially spaced end housing members 52 and 54. The member 52 carries a plurality of radially extending ribs or fins 56 which function as a fan means for circulating air across the outer marginal surface of the member 52 whereby to dissipate heat from the reservoir 48 as shall hereinafter be more fully described. The member 52 is provided with an outwardly extending radial flange 58 which is adapted to be connected to the flywheel 12 via a plurality of suitable bolts, screws or the like 60. The member 52 also includes an axially extending shoulder section 62 which inwardly engages the bore 50 of the flywheel 12 and carries an O-ring 64 which provides a fluid tight seal therebetween. A plurality of integral circumferentially spaced lugs 66 project inwardly and to the right as viewed in FIG. 3 from an inner surface of the member 52, and form a spider formation adapted to slidably support a plurality of axially spaced clutch plates 68 which shall hereinafter be more particularly described. The inward radial end of the member 52 has an axially extending, annular shaped flange 70 having a central opening which defines a circumferentially extending shoulder 72. The shoulder 72 supports the outer race of an anti-friction bearing assembly 74 which is adapted to rotatably support an adjacent end of the flywheel 12 for rotary movement relative to the drive shaft 14. The assembly 74 is fixedly secured by a retainer ring 76 having an annular shaped section 78 which engages the shoulder 72 and bears against the outer radial surface of the race of the assembly 74. The ring 76 is connected to the member 52 by a plurality of circumferentially spaced bolts, screws, or the like 80 and is fluidly sealed relative to the member 52 via an O-ring sealing means 82. The retainer ring 76 also supports an annular lip seal 84 carried in a shoulder 86 formed in the central opening thereof and cooperating with an outer peripheral surface of a shaft retaining sleeve 88. The sleeve 88 is fixedly connected to the drive shaft 14, and preferably carries an O-ring sealing means 90, the latter providing a fluid tight seal between the outer peripheral surface of the shaft 14 and the inner peripheral surface of the sleeve 88.

The second end housing member 54 also includes a plurality of radially extending fins or ribs 92 also adapted for heat dissipation, and is sealingly connected to the flywheel 12 via an O-ring sealing means 94, and a plurality of circumferentially spaced fastener means 96. The O-ring 94 is carried in a groove of an axially extending projection 98 having an outside diameter adapted to be snugly received in a counterbore 100 formed in the flywheel 12. The member 54 and correspondingly the right end of the flywheel 12, is rotatably supported by the drive shaft 14 via an anti-friction bearing assembly 102. In this regard, the outer race of the assembly 102 is disposed in a central opening of an axially extending hub section 104 of the member 54, the section 104 including an inwardly extending flange 106 which sealingly engages the left axial end of the outer race. The opposite end of the assembly 102 is engaged by an annular shaped projection 108 of a bearing retainer member 110 which is detachably connected to the end housing member 54 via a plurality of suitable fastener means. The member 110 includes a cylindrically shaped, axially extending hub section 114 having a central opening 116 which defines an annular fluid passage 118 between an outer peripheral surface of a bearing spacer ring 120. The ring 120 is interposed between the assembly 102 and the inner race of a second anti-friction bearing assembly 122. The bearing assembly 122 functions to support the right end of the drive shaft as viewed in FIG. 3 and is retained by an outer housing assembly of the brake unit 42 as shall hereinafter be described in detail.

In the subject invention torque is transmitted from the flywheel 12 to the drive shaft 14 by axially compressing the clutch plates 68 with a plurality of interleaved friction discs 124. In this regard, each of the clutch plates 68 are provided with a plurality of external, circumferentially spaced, notches in accordance with the number of lugs 66, and are slidably keyed thereto for rotation with the flywheel 12. The friction discs 124, on the other hand, can each include an internal spline formation formed about a central opening which is adapted for cooperative axially sliding engagement with an external spline formation 126 formed about the outer periphery of a hub member 128. The member 128 is connected for rotation with the drive shaft 14 by a key 130 located in a keyway 132. It therefore will be noted that the complementary spline formations permits relative axial movement of the friction discs 124 along the member 128, but precludes relative rotatable movement between the discs 124 and the drive shaft 14.

The subject clutch unit 10 is preferably of the viscous shear or "wet clutch" type. In such units a film of a viscous liquid disposed on adjacent radially extending surfaces of the plates 68 and discs 124 is sheared in response to compressively engaging the plates 68 and friction discs 124. The utilization of a viscous liquid between the plates 68 and discs 124 provides the advantages of minimizing plate and disc wear and also permits a means for heat dissipation. In this regard, the member 128 is provided with a plurality of axially extending circumferentially spaced fluid passages 134. Each of the passages 134 are in fluid communication with the plates 68 and discs 124 via a plurality of axially spaced, radially extending, passages 136. The left end of the passage 134 is in fluid communication with an annular groove or recess 138 formed in the right face of a bearing retainer ring 140. The viscous liquid is supplied to the groove 138 by a longitudinally extending, centrally located, bore 142 located in the drive shaft 14, the bore 142 being in communication with the outer periphery of the shaft 14 by one or more radially extending passages 144. Correspondingly, the ring 140 has an annular shaped groove 146 disposed in the outer periphery thereof which fluidly communicates the recess 138 via a plurality of radially extending passages 148. Thus, by communicating the longitudinal passage 142 to a source of viscous liquid, a liquid film can be maintained on the adjacent faces of the plate 68 and discs 124 and heat can be efficiently dissipated therefrom via flow control of the quantity of liquid.

In the subject clutch unit 10, the flywheel 12 is drivingly connected to the shaft 14 by compressively engaging the clutch plates 68 and the friction discs 124. In this regard an axially fixed, annular shaped flange 150 is located at the left end of the series of plates and discs 68 and 124, respectively. The inner peripheral surface of the flange 150 is seated in a counterbore 152 formed in the left end of the hub member 128 and fixedly connected therewith by a weld fillet 154. The plates 68 and discs 124 are compressively urged to the left against the flange 150 by an actuating assembly indicated generally at 156. The assembly 156 is comprised of an axially stationary piston member 158 and an axially displaceable cylinder 160 forming an enclosure therearound. The cylinder 160 is comprised of a generally cup-shaped member 162 having a thrust plate section 164 located at its left end as viewed in FIG. 3 which contactingly abuts the right end of the series of plates and discs 68 and 124, respectively. The inward peripheral surface of the section 162 includes an internal spline formation which slidably engages the external spline formation 126 formed on the hub member 128. An inward peripheral surface of the member 162 carries an O-ring 166 for providing a fluid tight seal between the outer peripheral surface of the drive shaft 14 and the cylinder 160. A skirt section 168 extends to the right and engages aa circumferentially formed shoulder 170 formed in a radially extending cover plate member 172. An inner peripheral surface of the member 172 carries an O-ring 174 which fluidly seals the opposite axial end of the cylinder 160. The members 162 and 172 are connected by a plurality of circumferentially spaced screws, bolts, or the like 176 and a pair of compartments 178 and 180, formed on opposite axial sides of the piston 158 is fluidly sealed by an O-ring 182 carried in an outer peripheral surface thereof. The cylinder 160 is biased to the right by a plurality of circumferentially spaced coil spring members 184. The springs 184 are located in a plurality of circumferentially spaced, axially extending, counterbores 186 formed in the right end of the hub member 128, with each of the counterbores 186 being coaxial with one of the fluid passages 134. Each of the intersections of the coaxial passages 134 and counterbores 186 define a radially extending shoulder 188 which is adapted to seat one end of the spring 184, an opposite end engaging an outer radially extending surface portion of the cylinder 160.

The clutch plates 68 and friction discs 124 are compressively engaged by introducing a pressurized media in the compartment 178. In this regard it will be seen that the drive shaft 14 is provided with a longitudinally extending, centrally located passage 190 having a radially enlarged, threaded section 192 located at the right end of the shaft 14 which is adapted to threadably receive a rotary union (not shown). The union is connected to a source of pressurized fluid media such as compressed air via suitable conduit or piping means which preferably includes valving means for selectively introducing the pressurized media from the source to the passage 190. The left end of the passage 190 is in fluid communication with the compartment 178 via one or more radially extending passages 194, and an annular groove or recess 196 formed on the inner periphery of the piston 158.

The compartment 180 on the other hand is vented to atmosphere. To facilitate fluid communication between the compartment 180 and an atmospheric environment, the drive shaft 14 is provided with an eccentrically located, longitudinally extending passage 198 which is outwardly radially spaced relative to the passage 190. The passage 198 is in fluid communication with the compartment 180 via one or more radially extending passages 199, an annular groove 200 formed in a central opening of an annularly shaped spacer element 204, and a plurality of radially extending passages 202 formed in the left end of the element 204. The element 204 is axially located between the piston 158 and the bearing assembly 102, and the outer peripheral surface thereof is utilized to slidably support the right end of the cylinder 160 for axial slidable movement. The radial passage 199 is fluidly sealed by suitable O-ring sealing means 206 and 208, the sealing means 206 and 208 being located in axially spaced, circumferentially extending, grooves or recesses 210 and 212, respectively formed in the outer periphery of the drive shaft 14.

In the form or arrangement of the invention illustrated in FIGS. 1 and 3, the brake unit 42 is disposed adjacently to the right of the unit 12. This arrangement permits the transfer of viscous liquid from the reservoir 48 to the unit 42 as shall hereinafter be more fully described in detail. The brake unit 42 includes an outer housing assembly comprised of a pair of axially spaced end walls 214 and 216, and first and second axially extending outer wall members 218 and 220. The end wall member 214 is connected to the ring 36 by a plurality of circumferentially spaced bolts, screws, or the like 226 and includes a circumferentially extending shoulder 222 which is adapted to be cooperatively seated in an enlarged central opening 224 formed therein. The member 214 also includes a central opening which defines a circumferentially extending shoulder 228 and is adapted to cooperatively receive the outer race of the anti-friction bearing assembly 122. The outer race of the assembly 122 is axially secured by a combination seal and bearing retainer ring 230 detachably connected to the wall member 214 by a plurality of suitably located fastener means 236. The retainer ring 230 has an axially extending hub section 234 which carries an annular lip seal 232 adapted to provide a fluid tight seal between the ring 230 and the sleeve portion 114 of the retainer member 110. The end wall 214 is also provided with a plurality of circumferentially spaced brake lugs 240 which extend inwardly and to the right as viewed in FIG. 3, and collectively define a brake spider formation of preferably similar arrangement as the clutch spider formation 66. A plurality of externally notched brake plates 242, preferably identical with the clutch plates 68, are axially slidably supported by the lugs 240 and individually interleaved with a plurality of friction discs 244. Each of the discs 244 has an internal spline formation which is cooperatively slidably located on an external spline formation 246 formed on the outer periphery of a cylindrically shaped hub member 248. The member 248 is connected for rotation with the drive shaft 14 by a key member 250 disposed in a keyway indicated generally at 252. The left end of the member 248 has an axially extending shoulder 254 which bears against the inner race of the bearing assembly 122, and the opposite axial end of the member 248 is urged to the left by a washer element 258 and a retainer ring 256 which is threadably engaged to a threaded section 260 located on the outer peripheral surface of the shaft 14. The left end of the housing member 218, as viewed in FIG. 4, is seatingly located in a circumferentially extending shoulder 219 formed in an adjacent outer radial surface 219 of the end wall 214, and is connected thereto by a plurality of suitable bolts, screws, or the like 262. A radially extending threaded bore 264 is located in the top or upper peripheral surface of the member 218 and is adapted to receive a threaded fitting and suitable conduit (not shown) whereby the viscous hydraulic fluid may be returned from the brake unit 42 to the fluid source. The right axial end of the member 218 has a radially enlarged, circumferentially extending flange 266 which is connected via a plurality of suitable fastener means 270 to a complementary flange section 268 of the member 220.

The housing member 220 forms a cylinder housing for an axially displaceable actuating piston 272 and is comprised of an inward, radially extending wall section 274 carrying an O-ring sealing means 276 in a central opening, and an axially extending, cylindrically shaped section 278 having an end section engaged in a circumferentially shaped shoulder 280 formed in the end wall 216. The end section of the housing member 278 is connected to the end wall 216 by a plurality of circumferentially spaced bolts, screws, or the like 282 threadably engaged to complementary bores suitably spaced in the end face of the member 278.

The piston 272 has an axially extending hub section 284 which defines an integral annular shaped thrust plate 286 which confronts the right radial end of the series of plates 242 and discs 244. The opposite or left end of the plates and discs 242 and 244 are disposed proximate an axially, relatively stationary face 288 formed on the inner surface of the end wall 214. The piston 272 is biased to the left by a plurality of circumferentially spaced, coil spring members 290, the springs 290 having one end located in cylindrically shaped openings 292 formed in the hub section 284 and an opposite end disposed in suitably aligned coaxially extending bores 294 formed in the end wall 216. First and second compartments 296 and 298 are defined on opposite axial sides of the piston 272 which are fluidly sealed by an O-ring sealing means 300 carried in the outer periphery of the piston 272. Correspondingly, a central opening 301 formed in the piston 272 is fluidly sealed by an O-ring sealing means 302 carried in an annular shaped groove or recess 303 formed in the end wall 216. The compartment 296 is in fluid communication with a radially extending passage 304 formed in the housing member 220 via an inclined passage 306. The outward end section of the passage 304 is threaded and adapted to receive a suitable conduit or pipe fitting whereby the bore 304 can be connected to a source of pressurized media, such as compressed air. Correspondingly, the compartment 298 can be vented to atmosphere or alternatively can be in fluid communication with a source of compressed air whereby to assist the force applied by the coil springs 290. With respect to the latter, an axially extending threaded passage 308 is disposed in the end wall 216 for receiving a suitable pipe or conduit fitting (not shown). The end wall 216 also includes a circumferentially extending shoulder 310 which is engaged by an annular shaped seal supporting ring 312. The ring 312 is connected to the end wall 216 by a plurality of suitable bolts, screws, or the like 314 and carries in a circumferentially extending shoulder 316, an annular lip seal 318 adapted to provide a fluid tight seal between the shaft 14 and the end wall 216.

One particularly important feature of the present invention resides in the fact that effective cooling or heat dissipation is achieved without the need for any ancillary forced air fans or the like. Note that the longitudinal passage 142 is adapted to be in fluid communication with a source of pressurized hydraulic fluid. In the subject invention this hydraulic fluid is utilized to transfer the heat generated by frictional engagement of the clutch and brake, and additionally for maintenance of a hydraulic film on the clutch and brake plates 68 and 242, respectively, and the friction discs 124 and 244 whereby to reduce to a minimum any tendency for wear. Moreover, the ribs of fins 56 and 92 disposed on the outer periphery of each of the end walls 62 and 54 function as an air circulating means to transfer a substantially large volume of air across the outer housing of the unit 12, the air circulation effecting a heat transfer away from the clutch to cool the hydraulic fluid interiorly in the reservoir 48. Additionally, the inner periphery of the flywheel 12 is in direct contact with the hydraulic fluid and thereby functions as a heat sink for also reducing the temperature of the hydraulic fluid within the reservoir 48. In the subject embodiment, the brake unit 42 is supplied with hydraulic fluid from the clutch unit 12. Note that hydraulic fluid is circulated from the right end of the clutch unit 10 across the bearing assemblies 102 and 122 and through the annular passage 118 to the brake unit housing 42. After passing over the brake plates 242 and friction discs 244, the fluid is preferably returned to the source of hydraulic fluid via suitable conduit means connected to the bore 264. As required, a suitable heat exchanger can be interposed between the return and supply lines whereby to accommodate the particular application of the clutch and brake units 10 and 42, respectively.

To operate the clutch and brake units 10 and 42, assume that the longitudinal passage 190 is connected to a source of pressurized fluid media, such as compressed air, and the supply system is provided with suitable valve means for selectively pressurizing the compartment 178. Correspondingly, the compartment 296 is also connected to a source of compressed air, and if desired, the compartments 298 may also be connected to a source of compressed air to accommodate those instances when it is desired to supplement the applied forces provided by the set of coil springs 184.

Initially, it will be noted that the applied force of the coil springs 184 will bias the actuating cylinder 160 to the right whereby to disengage the clutch plates 68 from the friction discs 136 and permit the flywheel 12 to rotate independently of the drive shaft 14. Simultaneously, the coil springs 290 of the brake unit biases the piston member 272 to the left as viewed in FIG. 3 whereby to frictionally engage the brake plates 242 to the friction discs 244 with result that the drive shaft 14 is fixedly secured to the stationary support structure of the press or machine 18. To release the brake plates 242 and the friction discs 244, the pressurized media is introduced to the compartment 296 to overcome the spring force and to displace the piston 272 to the right. In this position of the piston 272, it will be seen that the drive shaft is released from the support structure. To drivingly connect the flywheel 12 to the drive shaft 14, a pressurized fluid media is introduced into the compartment 178 which tends to urge the cylinder 160 to the left against the bias of the coil springs 184. Movement to the left compressively engages the clutch plates 68 with the friction discs 136 whereby to viscously shear the oil film between adjacent radially extending surfaces, and accordingly drivingly connecting the drive shaft 14 for rotation with the flywheel. The steps recited above are simply reversed when it is desired to disconnect the flywheel 12 and the drive shaft 14.

Another form or arrangement of the subject invention is illustrated in FIGS. 2 and 4. For purposes of clarity, the same numeral that was used in FIGS. 1 and 3 are used to designate similar elements and components but with the addition of a prime (') suffix. In this arrangement a drive shaft 14' extends longitudinally outwardly from oppositely spaced end walls 20' and 22' of a machine or press 18'. The press 18' includes an enclosed crown section 16' housing a pair of longitudinally spaced, intermediate or main gears, indicated generally at 44'. The gears 44' are driven by a pair of axially spaced pinion gears 46' mounted on the outer periphery of the shaft 14'. The left end of the shaft 14', as viewed in FIG. 2, is rotatably supported by a suitable bearing means 28' supported in an opening formed in the end wall 20'. A separate brake unit 42' is mounted on an outer marginal surface of the wall 20', the unit 42' being of substantially similar construction to the brake unit illustrated in FIGS. 1 and 3. The right end of the shaft 14' is also rotatably supported by a bearing means 102 carried in the end wall 22'. The drive shaft 14' is selectively drivingly connected to a flywheel 12' by a clutch unit 10' again mounted in an inner peripheral bore thereof. The clutch unit 10' can be identical to the clutch unit 10 but includes various modifications which are best seen with reference to FIG. 4.

With reference to FIG. 4, the drive shaft 14' projects outwardly and to the right through a coaxially formed opening 320 disposed in the side wall 22' of the press crown 16'. A combination bearing and seal supporting member 322 is disposed in the opening 320, and includes a circumferentially extending shoulder 324 which is adapted to engageably receive the outer race of an anti-friction bearing assembly 326. The assembly 326 is retained in the shoulder 324 by an annular shaped retaining ring 328, the latter carrying an annular lip seal 330 in an outer end of a hub section 332 thereof to provide a fluid tight seal between the shaft 14 and the ring 328. The ring 328 also includes an outward, radially extending, flange 334 which is connected to the member 322 by a plurality of circumferentially spaced screws, bolts, or the like 336 and fluidly sealed by an O-ring sealing means 340, the latter being located in a groove formed in an inwardly projecting, annular shaped, lug section 338. The opposite axial end of the bearing assembly 326 is fluidly sealed by an annular lip seal 342 carried in a shoulder formed in the member 322. A bearing retainer ring 344 is connected to the end wall 52' by suitable fastener means 345, and includes an axially extending hub section 346 having an inner peripheral surface radially spaced from an outer surface of a bearing spacer ring 348 whereby to define an annular shaped fluid passage 352. The passage 352 partially defines a fluid path for returning hydraulic fluid to the source. In this regard, an axially extending, threaded return port 354 is located in a top or upper surface of the ring 328 which is adapted to receive a suitable conduit or pipe fitting (not shown) for fluidly connecting the unit 10' to the source.

The right end of the clutch unit 10' includes an end wall 54' carrying an anti-friction bearing assembly 102'. The assembly 102' is fixedly secured by a retainer ring 352 having a flange portion 354 connected to the end wall 54' by suitable fastener means indicated generally at 356. The ring 352 also carries an annular lip seal 358 which provides a fluid tight seal for the right end of the clutch unit 10'.

The remaining parts, components and elements of the clutch unit 10' can be substantially identical to the corresponding parts, components and elements described in conjunction with the clutch unit 10 and are therefore omitted. Correspondingly, the operation of the clutch unit 10' and brake unit 42' can also be accomplished in accordance with the operation previously described and is therefore also omitted.

An alternate arrangement with respect to mounting the clutch unit 10' within the flywheel 12' is also illustrated in FIG. 4. In this regard, it will be seen that the flywheel 12' includes an inward, radially extending, flange 360 located in a centrally located opening or bore 50' thereof. The flange 360 is connected to an axially extending housing member 362 which extends between first and second, axially spaced end walls 52' and 54'. The flange 360 is engageably disposed in a circumferentially extending shoulder 364 formed in the member 326 and connected thereto by a plurality of suitably circumferentially spaced bolts, screws, or the like 366. Correspondingly, the right and left end portions of the housing member 362 are connected to the end walls 52' and 54' and respectively, by a plurality of suitable bolts, screws, or the like 60' and 96'. An advantage of the alternate arrangement resides in the fact that the outer periphery of the member 362 can also be used in an air circulating function. In this regard it will be seen that a plurality of axially extending ribs or fins 368 are circumferentially spaced about the outer periphery of the member 362. Thus, these ribs or fins 368 can be utilized to supplement the air circulation provided by the radially extending fins 56' and 92' respectively. The alternate arrangement also offers the advantage that the clutch unit 10' can be preassembled preparatory to the flywheel being operatively positioned and mounted whereby the unit 10' can be thoroughly adjusted, tested, and generally placed in a workable position.

Both of the preferred embodiments of the clutch unit 10 and 10' of the present invention will be seen to have a wide variety of different applications, including virtually all types of flywheel type metal forming, metal drawing, or stamping presses, with the present invention finding particularly useful application in replacing conventional so-called dry clutch presses heretofore known in the art so that such presses may be readily converted or up-dated through the installation of the clutch-brake unit 10 of the present invention.

While it will be apparent that the preferred embodiments illustrated herein are well calculated to fulfill the objects above stated, it will be appreciated that the present invention is susceptible to modification, variation and change without departing from the proper scope or fair meaning of the subjoined claims.

I claim:

1. In combination with a rotatable housing formed of a flywheel and spaced rotatable end plates mounted on a pair of spaced bearings on a drive shaft supported in bearings in which it is to be driven by said flywheel, a clutch unit disposed internally of the flywheel between said spaced bearings and comprising a plurality of clutch plates connected to the flywheel and a plurality of clutch discs connected to said drive shaft, a non-rotatable housing axially spaced from said rotatable flywheel, a brake within said non-rotatable housing comprising a plurality of brake plates connected to said non-rotatable housing and a plurality of brake discs connected to said drive shaft, first actuating means disposed within said rotatable flywheel and movable in one direction for selectively frictionally engaging said clutch plates with said clutch discs, said actuating means including an enclosure concentric with said drive shaft and adapted to slide axially thereof, a radially disposed partition located within said enclosure and separating the interior thereof into first and second axially spaced chambers, said partition being relatively axially immovable relative to said drive shaft, and fluid passage means communicable with a source of pressurized fluid for selectively pressurizing one of said chambers and thereby causing said enclosure to move axially of said drive shaft, and second actuating means within said non-rotatable housing for frictionally engaging said brake plates with said brake discs.

* * * * *